Patented Nov. 16, 1937

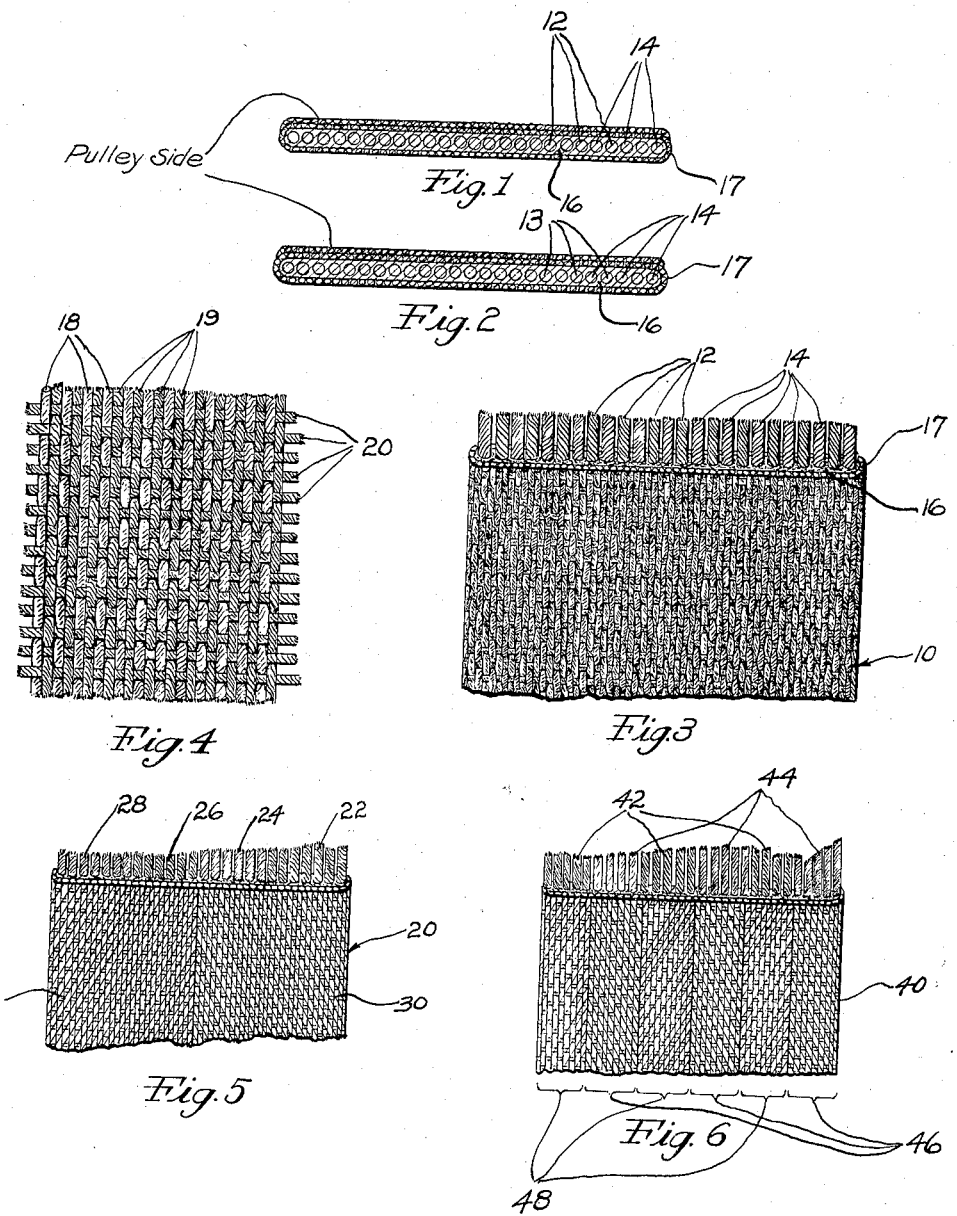

2,099,545

UNITED STATES PATENT OFFICE 2,099,545

BELT

Austin A. Teisher and Gordon I. McNeil, Akron, Ohio, assignors to Wingfoot Corporation, Wilmington, Del., a corporation of Delaware Application February 8, 1935, Serial No. 5,553

3 Claims. (Cl. 74—231)

This invention relates to belts and, more particularly, to belts which are designed and constructed to run straight on pulleys without tendency to move sideways or work off the pulleys while running, and to improved methods for manufacturing same.

Prior to the present invention it has been found that many factors contributed to the crooked running of belts, ordinarily of the flat-conveyor or flat-driving type, particularly when these belts are over approximately five inches in width. The various difficulties which have been noted in the past include: (a) crooked curing of the belt which results in an offset portion in the belt; (b) the twist effect of the belt which causes the belt to normally twist when it is not stretched between pulleys; (c) conical effect on a belt which means that one edge of the belt is of lesser circumference than the other edge of the belt; (d) varying thickness in the belt due to improper curing; (e) misaligned pulleys; (f) the effect of using bias-cut fabric envelopes or covers for the belt, and (g) it has now been determined that twist characteristics of fabric and cords have a decided effect on the straight running of belts.

Concerning the foregoing, it will be recognized that many of the difficulties can be avoided and overcome by using greater care in the manufacture of the belt to insure flat, even curing under proper conditions of stretch and alignment. However, relative to the type of envelope and the use of different twist fabric and cord, difficulties can arise even while exercising the highest degree of manufacturing skill. Thus, prior to the present invention, Patent No. 1,676,845 issued to A. A. Teisher on a belt having load-carrying cords of different twist to balance the belt and make it straight running.

It has been found, however, by considerable experiment that while the said patent method resulted in a materially improved belt over former new constructions, there was still a tendency in certain sizes for the belts to run crooked. This was true both with respect to the bias fabric and the straight fabric envelope and very considerable experimentation and development work was conducted to determine exactly why belts tended to run to one side. As a result of these extended experiments the belt and method of the present invention resulted. Thus, in belt sizes which have heretofore always proved troublesome the basic difficulties have been avoided and overcome to provide a new and novel process for producing a long-wearing, straight-running belt.

The foregoing difficulties of the prior art and the advantages and objects of the present invention are achieved by the belt and method hereafter described and illustrated in the attached drawing, wherein:

Fig. 1 is a cross-sectional view taken on line 1—1 of Fig. 3 and illustrates a belt embodying the principles of the invention;

Fig. 2 is a cross-sectional view similar to Fig. 1 of a modified form of belt embodying the principles of the invention;

Fig. 3 is a plan view partly broken away of a belt constructed in accordance with the invention;

Fig. 4 is an enlarged view of the fabric envelope of the belt shown in Fig. 3;

Fig. 5 is a plan view of a section of a belt embodying another form of the invention;

Fig. 6 is a plan view of a belt section embodying another form of the invention;

According to the present invention the entire belt structure is carefully constructed so that the various fabric parts thereof will balance each other and provide a straight-running belt. This is accomplished by utilizing cords or fabric having right-hand twist in certain portions of the belt and cords or fabrics having a left-hand twist in other portions of the belt. For example, having reference to Fig. 3, the numeral 10 indicates generally a belt structure having load-carrying cords 12 of a left-hand twist and load-carrying cords 14 of a right-hand twist with the various cords being placed in one or more layers or planes in the belt and being embedded in a rubber body 16. The rubber body 16 and the embedded cords 12 and 14 are surrounded by a straight-laid, cross-woven fabric envelope 17 in which the circumferentially extending warp cords are formed in a balanced manner as by making every alternate cord of opposite twist. Thus, in Fig. 4 it will be seen that cords 18 are of a right-hand twist while the cords 19 are of a left-hand twist. The weft cords 20 may be of the same twist as shown or likewise these cords, as well, may be made each alternate cord of opposite twist so that the entire cord-reinforcing structure of the belt will be balanced against each other.

Various alternative methods of achieving the same end without departing from the fundamentals of the invention are likewise illustrated and described herein. Broadly, this is achieved by using right- and left-hand twist cords in various proportions with the same type of cord laid next to each other or staggered across the width of the belt in various amounts both in the cover and in the load-carrying cords in the belt.

More specifically, having reference to Fig. 5, a belt structure 20 is formed with load-carrying cords 22 in one quarter of the belt which are of left-hand twist. In the next quarter of the belt, cords 24 are of the right-hand twist. In the third quarter of the belt the cords 26 are again of a left-hand twist, while in the last quarter of the belt the cords 28 are again of a right-hand twist. In this manner the load-carrying cords are balanced against each other while the envelope can be balanced by making one-half of the warp cords of left-hand twist with the other half of the warp cords being of right-hand twist. This construction is diagrammatically indicated in Fig. 4 by the diagonal lines 30 showing left-hand twist and 32 showing right-hand twist.

Referring to the belt structure indicated generally at 40 and shown in Fig. 6, the belt is balanced by making alternately spaced portions 42 of the reinforcing cords of one twist while the remaining portions 44 of the cords are of an opposite twist. In the same manner the envelope for the belt is formed with alternate sections of the warp cords in opposite twist as indicated by the groups 46 and 48 of the diagonal lines.

In actual practice the method of making up the new and improved belt is generally similar to that followed heretofore and disclosed, for example, in Teisher Patent 1,676,845. However, by the process of the present invention the method of the Teisher Patent 1,676,845 is improved on by building up the belt and balancing it on the building drums or pulleys. This is because it has been found that when the belt will run straight on the building drum it will also run straight in use after vulcanization.

Briefly, the prior-known building methods ordinarily comprised applying the rubberized envelope fabric around spaced-apart building drums with the envelope itself forming what might be termed a wide, flat belt or endless band. Then, reinforcing cords or load-carrying cords were run on either as a single endless cord about the envelope fabric until a layer or layers of load-carrying cords were built up, or else two or more cords were laid down simultaneously from the center outwardly to achieve the same end as disclosed in Patent No. 1,930,747.

An important feature of the present invention is to modify the former manner of building belts as just described by first applying the envelope fabric to the spaced building pulleys or drums and to thereafter run on between approximately 40% to approximately 90% and ordinarily about 80% of the total load-carrying cords employed. These cords are ordinarily of alternately opposite twist so that they will be balanced. The partially completed belt will now be run on the building pulleys and movement of the belt to one side or the other will be determined. If the belt moves to the left, right-hand twist reinforcing cord is run on until the tendency of the belt to move to the left is overcome. If, on the other hand, the belt tends to move to the right after, say 80% the reinforcing cords have been applied, then left-hand twist cords are run on the belt until the construction is balanced to provide a straight-running belt. The remaining cords are now run in with alternate cords of opposite twist or so that the number of right-hand cords is equal to the number of left-hand cords in the remaining portion of the belt. The fabric envelope edges are now folded back over the center of the belt in the usual manner and the belt is completed in accordance with standard practices. The finished belt, except for vulcanization, may now be again tested for straight running if desired and if wrong can be torn apart and readily corrected by removing wrong twist cord and filling in more cord of the balancing twist.

From the foregoing, it will be evident that a novel method has been provided for producing balanced belt constructions in which there will be no tendency to move sideways on the pulleys or to run crookedly. This is because the inherent belt structure has been completely balanced on the building machine so that the finished belt will run very straight. The improvements are particularly applicable to flat belts over five inches in width. Of course the principles of the invention are applicable to belts of all sizes and kinds, including conveyor belts, driving belts, etc.

While the invention teaches the novel building method just described it should be understood that other methods can be utilized to make particular belts in which the exact numerical relation of cords has been determined from experience. In cases of this character where the exact fabric and respective counts to effect a balanced belt have been tried and proven, the belt can be built by the above Teisher patent method or other similar or modified methods to effect the desired end.

As a particular example of an inherently balanced belt construction the invention provides a belt in which 60% right-hand twist, reinforcing or load-carrying cords are used and 40% left-hand twist cords with the additional right-hand twist cords offsetting the effect of a straight-laid, left-hand twist warp thread in the fabric envelope.

In accordance with the patent statutes certain embodiments of the invention have been illustrated and described in detail, however, it will be appreciated that the invention is not limited thereto or thereby but is defined in the appended claims.

What we claim is:

1. A belt comprising a layer or layers of load-carrying cords of alternately opposite twist to effect a balanced running structure, said cords being embedded in rubber, and an envelope of straight cut rubberized fabric surrounding the cords, said envelope being of balanced construction insuring straight running of the belt in use and having longitudinally extending cords of alternately opposite twist.

2. A flat driving belt comprising a rubber base reinforced with longitudinally extending cords, certain of said cords being of left-hand twist and certain of right-hand twist, and a straight-cut cross-woven fabric envelope surrounding said base and characterized by longitudinal cords, part of which are of right-hand twist and part of left-hand twist.

3. A belt comprising a core of vulcanized rubber having right- and left-hand twisted cords embedded therein in substantially equal proportions and enclosed in an envelope of straight-cut rubberized fabric, said fabric being also characterized by longitudinal cords of right- and left-hand twist whereby to provide a balanced construction.

AUSTIN A. TEISHER.
GORDON I. McNEIL.